(12) United States Patent
Zeljkovic et al.

(10) Patent No.: US 10,121,476 B2
(45) Date of Patent: Nov. 6, 2018

(54) SYSTEM AND METHOD FOR GENERATING CHALLENGE UTTERANCES FOR SPEAKER VERIFICATION

(71) Applicant: Nuance Communications, Inc., Burlington, MA (US)

(72) Inventors: Ilija Zeljkovic, Scotch Plains, NJ (US); Taniya Mishra, New York, NY (US); Amanda Stent, Chatham, NJ (US); Ann K. Syrdal, Morristown, NJ (US); Jay Wilpon, Warren, NJ (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 84 days.

(21) Appl. No.: 15/075,333

(22) Filed: Mar. 21, 2016

(65) Prior Publication Data
US 2016/0203821 A1    Jul. 14, 2016

Related U.S. Application Data

(62) Division of application No. 12/954,094, filed on Nov. 24, 2010, now Pat. No. 9,318,114.

(51) Int. Cl.
*G10L 17/00*  (2013.01)
*G10L 17/24*  (2013.01)
(Continued)

(52) U.S. Cl.
CPC .............. *G10L 17/24* (2013.01); *G10L 15/02* (2013.01); *G10L 17/04* (2013.01); *G10L 15/08* (2013.01);
(Continued)

(58) Field of Classification Search
CPC .......... G10L 17/00; G10L 17/04; G10L 17/24
See application file for complete search history.

(56) References Cited

U.S. PATENT DOCUMENTS

| | | |
|---|---|---|
| 5,339,385 A | 8/1994 | Higgins |
| 5,465,290 A | 11/1995 | Hampton et al. |

(Continued)

OTHER PUBLICATIONS

Eatock, J.P. et al., "A quantitative assessment of the relative speaker discriminating properties of phonemes.", Acoustics, Speech, and Signal Processing, 1994. ICASSP-94., 1994 IEEE International Conference on vol. 1. IEEE, 1994.

(Continued)

*Primary Examiner* — Jialong He

(57) ABSTRACT

Disclosed herein are systems, methods, and non-transitory computer-readable storage media relating to speaker verification. In one aspect, a system receives a first user identity from a second user, and, based on the identity, accesses voice characteristics. The system randomly generates a challenge sentence according to a rule and/or grammar, based on the voice characteristics, and prompts the second user to speak the challenge sentence. The system verifies that the second user is the first user if the spoken challenge sentence matches the voice characteristics. In an enrollment aspect, the system constructs an enrollment phrase that covers a minimum threshold of unique speech sounds based on speaker-distinctive phonemes, phoneme clusters, and prosody. Then user utters the enrollment phrase and extracts voice characteristics for the user from the uttered enrollment phrase. The system generates a user profile, based on the voice characteristics, for generating random challenge sentences according to a grammar.

16 Claims, 11 Drawing Sheets

(51) Int. Cl.
 G10L 15/02 (2006.01)
 G10L 17/04 (2013.01)
 G10L 15/08 (2006.01)
 G10L 17/26 (2013.01)
(52) U.S. Cl.
 CPC ............. *G10L 17/00* (2013.01); *G10L 17/26* (2013.01); *G10L 2015/025* (2013.01)

(56) References Cited

U.S. PATENT DOCUMENTS

| | | | |
|---|---|---|---|
| 5,548,647 | A | 8/1996 | Naik et al. |
| 5,687,287 | A | 11/1997 | Gandhi et al. |
| 5,752,231 | A | 5/1998 | Gammel et al. |
| 5,897,616 | A | 4/1999 | Kanevsky et al. |
| 5,913,192 | A | 6/1999 | Parthasarathy et al. |
| 6,401,063 | B1 | 6/2002 | Hébert et al. |
| 6,490,560 | B1 | 12/2002 | Ramaswamy et al. |
| 6,510,415 | B1 | 1/2003 | Talmor et al. |
| 6,519,563 | B1 | 2/2003 | Lee et al. |
| 6,556,127 | B1* | 4/2003 | Moser ................ G07C 9/00158 340/5.22 |
| 6,691,089 | B1 | 2/2004 | Su et al. |
| 6,697,778 | B1 | 2/2004 | Kuhn et al. |
| 6,760,701 | B2* | 7/2004 | Sharma .................. G10L 15/04 704/234 |
| 6,931,375 | B1 | 8/2005 | Bossemeyer, Jr. et al. |
| 7,231,350 | B2 | 6/2007 | Gable et al. |
| 7,289,957 | B1 | 10/2007 | Grashey et al. |
| 8,234,494 | B1 | 7/2012 | Creswell et al. |
| 2002/0002465 | A1 | 1/2002 | Maes et al. |
| 2002/0104025 | A1* | 8/2002 | Wrench, Jr. ................ H04L 9/08 726/3 |
| 2003/0014247 | A1 | 1/2003 | Ng et al. |
| 2003/0046083 | A1 | 3/2003 | Devinney, Jr. et al. |
| 2003/0125944 | A1 | 7/2003 | Wohlsen et al. |
| 2005/0071168 | A1 | 3/2005 | Juang et al. |
| 2005/0096906 | A1 | 5/2005 | Barzilay et al. |
| 2005/0143996 | A1 | 6/2005 | Bossemeyer et al. |
| 2005/0273333 | A1 | 12/2005 | Morin et al. |
| 2006/0020459 | A1 | 1/2006 | Carter et al. |
| 2006/0178885 | A1* | 8/2006 | Tavares .................. G10L 17/08 704/246 |
| 2006/0190264 | A1 | 8/2006 | Jaramillo et al. |
| 2006/0287863 | A1 | 12/2006 | Santos et al. |
| 2007/0255564 | A1 | 11/2007 | Yee et al. |
| 2007/0294083 | A1 | 12/2007 | Bellegarda et al. |
| 2008/0082332 | A1* | 4/2008 | Mallett .................. G10L 15/07 704/250 |
| 2008/0195389 | A1 | 8/2008 | Zhang et al. |
| 2008/0255827 | A1* | 10/2008 | Nurminen ............... G10L 15/04 704/201 |
| 2009/0187405 | A1 | 7/2009 | Bhogal et al. |
| 2009/0259470 | A1* | 10/2009 | Chang ..................... G10L 17/22 704/246 |
| 2009/0319270 | A1 | 12/2009 | Gross et al. |
| 2010/0106502 | A1 | 4/2010 | Farrell et al. |
| 2012/0130714 | A1* | 5/2012 | Zeljkovic ................ G10L 17/24 704/235 |
| 2012/0281885 | A1* | 11/2012 | Syrdal .................... G10L 17/24 382/116 |

OTHER PUBLICATIONS

Rosenberg, "Automatic Speaker Verification: A Review", IEEE, Proceeding of the IEEE, Apr. 1976.

* cited by examiner

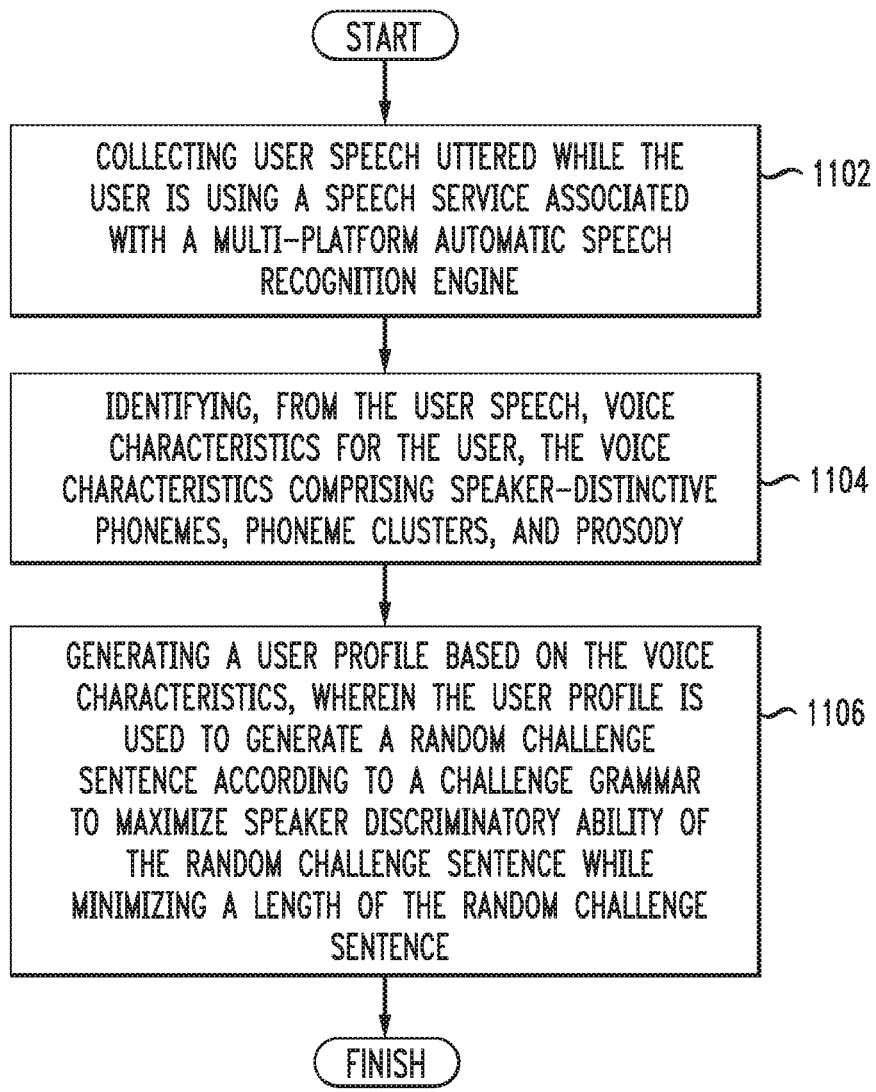

SYSTEM AND METHOD FOR GENERATING CHALLENGE UTTERANCES FOR SPEAKER VERIFICATION

CROSS-REFERENCE TO RELATED APPLICATIONS

This application is a Divisional of and claims priority to U.S. patent application Ser. No. 12/954,094, filed Nov. 24, 2010, entitled "System and Method for Generating Challenge Utterances for Speaker Verification." The contents of each of the foregoing is hereby incorporated by reference into this application as if set forth herein in full.

FIELD OF THE DISCLOSURE

The present disclosure relates to speaker verification and more specifically to preventing automated or other attacks on speaker verification systems.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches disclosed herein can fight an automated attack on a speaker verification system. Most speaker verification systems use only a small number of recorded words or utterances (e.g. digits), making it possible to record a human without his/her knowledge and then use that speech to break into the Speaker verification system. To overcome this possible attack, this disclosure uses random utterance generation. Random utterance generation provides several new features to the Speaker verification system. First, the system can use a large vocabulary and very large number of sentences, thus increasing the difficulty for a thief to steal sufficient speech to automate the generation of utterances in real time. The system can customize the lexicon for each individual speaker to optimize across phonemes (individual speech sounds), phoneme clusters, words, and prosodic patterns (speech tunes), to provide the best speaker discrimination on an individual basis.

Disclosed are systems, methods, and non-transitory computer-readable storage media for at least three distinct aspects of speaker verification. One aspect includes performing speaker verification. A system configured to practice this aspect receives an identity of a first user from a second user, and, based on the identity, accesses a user profile including voice characteristics. Then the system generates a challenge sentence, based on the voice characteristics, wherein the challenge sentence is generated randomly according to at least one of a rule and a grammar and prompts the second user to speak the challenge sentence to yield a spoken challenge sentence. The system verifies that the second user is the first user if voice characteristics of the spoken challenge sentence are a sufficient match with the voice characteristics of the user profile. One variation of this approach is to generate the challenge sentence in such a way as to maximize speaker discriminatory ability of the spoken challenge sentence while minimizing a length of the spoken challenge sentence. This variation can be implemented via a web interface and/or a mobile device interface, for instance.

Another aspect includes adaptively enrolling a user in speaker verification. A system configured to practice this aspect constructs at least one enrollment phrase based on speaker-distinctive phonemes, phoneme clusters, and prosody, wherein the at least one enrollment phrase covers a minimum threshold of unique speech sounds. Then the system prompts the user to utter the at least one enrollment phrase to yield at least one uttered enrollment phrase. The system extracts voice characteristics for the user from the at least one uttered enrollment phrase and generates a user profile based on the voice characteristics, wherein the user profile is used to generate a random challenge sentence according to a challenge grammar. The system can select the at least one enrollment phrase to maximize the ability to discriminate between speakers while minimizing length of the at least one enrollment phrase.

Yet another aspect includes stealth enrollment in speaker verification. In this aspect, the system collects user speech uttered while the user is using a speech service associated with a multi-platform automatic speech recognition engine. For example, a large telecommunications company can operate a single speech recognition engine that drives multiple voice-enabled services. When the user interacts with any of the voice-enabled services, the common multi-platform automatic speech recognition engine can gather information to create a voice profile for that user. The system identifies, from the user speech, voice characteristics for the user, the voice characteristics including speaker-distinctive phonemes, phoneme clusters, and prosody. Then the system generates a user profile based on the voice characteristics, wherein the user profile is used to generate a random challenge sentence according to a challenge grammar to maximize the ability to discriminate between speakers of the random challenge sentence while minimizing a length of the random challenge sentence.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 11 illustrates an example method embodiment for stealth enrollment in speaker verification.

DETAILED DESCRIPTION OF THE DRAWINGS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved approaches to performing speaker verification and enrollment in speaker verification. A brief introductory description of a basic general purpose system or computing device in FIG. 1 which can be employed to practice the concepts is disclosed herein. More detailed descriptions of speaker verification and enrollment approaches will then follow.

In a very simple, illustrative example of speaker verification, a user is authenticated based on his or her voice characteristics. An authentication system requests a speech sample from a user. The user provides the speech sample to the authentication system. Then the authentication system performs a comparison of the speech sample to a stored speech profile to determine whether or not the user is authorized. Improvements and variations to this simple example shall be discussed herein as the various embodiments are set forth. The disclosure now turns to FIG. 1.

Figure 1:
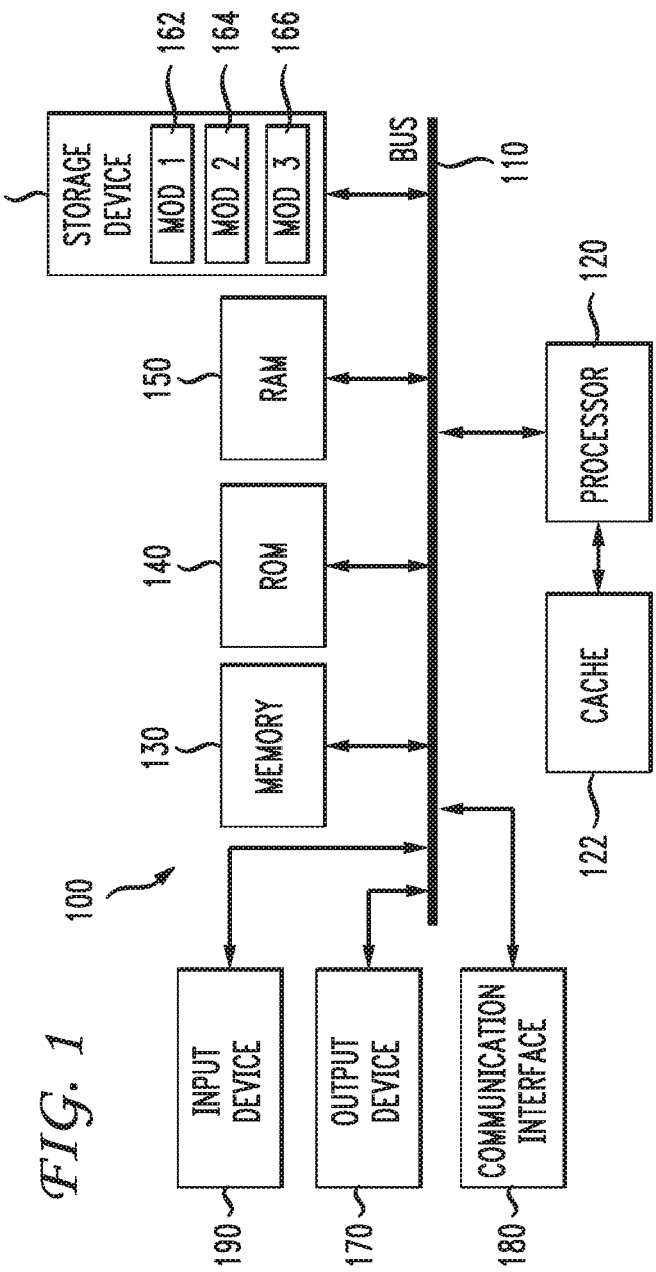
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of approaches to speaker verification. A user should be enrolled in a speaker verification system, such as a cloud-based service, before using speaker verification. As part of the enrollment process, the system must collect samples of customer speech that have good phoneme distribution or, in other words, cover a sufficient portion of the unique speech sounds in the language and/or for that speaker. For example, fricative and plosive phones may be less valuable and less necessary than nasal phones for purposes of verifying a particular speaker. In an active enrollment mode, the system collects speech by prompting users to speak one or more utterance. This approach can include a special selection method for enrollment utterances that take into account the most speaker-distinctive phonemes, phoneme clusters, and prosody. Using the above criteria, the system can construct a small number of utterances that covers the desired phoneme space. Collection of the small number of utterances is an important feature that helps make the speaker verification service user-friendly.

In an enrollment approach that is not cloud-based, a user enrolls using a personal device such as a laptop computer or cellular phone and establishes the personal device as the designated, preferred, and/or default device for performing speaker verification. Then the speaker verification system can contact the user via that personal device for verification. For example, if an online merchant wishes to verify the user's identity, the online merchant can contact the speaker verification system. In turn, the speaker verification system contacts the user via the personal device to present the challenge to the user to verify the user's identity. The challenge can be generated to optimize discrimination based on the user's speech as well channel characteristics associated with the personal device, such as the microphone type and quality, coding, sampling rate, and so forth. The speaker verification system can initiate contact the user for speaker verification related purposes via an SMS message, a push notification, a call, an instant message, a video communication session, an email, and/or other suitable communication channel.

In one variation, the system performs enrollment either wholly or partially in a "stealth" mode. For example, as the user uses cloud-based services that tie back to a unified speech-processing engine, the engine can process the user's speech. For example, when the user interacts with voicemail menus, makes phone calls, uses human-based directory assistance, or interacts with an interactive voice response (IVR) system for technical support, each of these services can communicate with a cloud-based speech-processing module that collects the user speech as part of the stealth enrollment.

Once the user is enrolled with utterances that cover all, most, or some minimum threshold of available or desired phonemes (individual speech sounds) in the language, the system can begin to incorporate many advantages. For example, the system can incorporate a virtually unlimited lexicon. The system can use a very large vocabulary and number of sentences, thus increasing the difficulty for a thief to steal sufficient quantities of appropriate speech and generate utterances in real time. The system can optimize custom vocabulary and prosody for distinctiveness. The system can customize the lexicon for each individual speaker to optimize for phonemes (individual speech sounds), phoneme clusters, words, and prosodic patterns (speech tunes) that provide the best speaker discrimination on an individual, demographic group, societal, or other group basis. Further, the system can filter or add to the lexicon dynamically based on a reported location of the user. For example, the system can be location-based and generate stimuli that require the user to use a particular intonation pattern specific to that location.

In one embodiment to prevent attacks on a speaker verification system, the system draws from an increased vocabulary of words/phrases to generate phrases to request from the user. Under this approach, for example, a set of pre-recorded isolated words strung together will be unable to pass a "liveness test". The system can generate semantically unpredictable sentences as challenge utterances and/or a large number of utterances from literature and/or personal writing. For example, semantically unpredictable sentences can still be personal friendly yet still not make sense. In another sense, the sentences are not necessarily semantically unpredictable, but the sentences are unpredictable in that imposters are unable to effectively predict the sentences in order to defeat the system. Some sentences can be semantically meaningful and still unpredictable. The system can generate unpredictable sentences randomly or, in one example, the sentences are unpredictable because the system selects the sentences from a very large database of sentences. In another example, the later words in the sentence are unpredictable by their close association with the initial words, such as in exemplary Harvard phonetically balanced sentences "The birch canoe slid on the smooth planks" or "Glue the sheet to the dark blue background".

The semantically unpredictable sentences can be of a general variety or a proper noun variety that includes specific proper nouns familiar to the speaker. Further, the semantically unpredictable sentences can be statements, questions, opinions, jokes, exclamations, and so forth. The syntactic structures of such sentences can include different prosodic patterns (speech tunes), including, but not limited to, differences in intonation, duration, pacing, and so forth in statements and questions. Some examples of such semantically unpredictable sentences are listed below:

The name slips near the tall texts.
What lamp stays before the young potatoes?
Did the beige group send the lip?
The areas flowed by a hard skin.
A shop entertains an important fire.

Surprise the mountains or the broad pears.
Where can students rate children?
The bills drank the sarcasm that comes.
A polite art jumps beneath the arms.
The law that finished shows the boots.
Why must the seat clean the bristles?
Did the happy fires love the amount?
Slice a free desk from the idea.
John Goatherd pointed to please the minds.
Did roads fix boots for Minneapolis?
Carine guessed from a pale zoo.
Greet Minnie Humphries or the hard capitals.
Throw the wild sound onto Florham Park.
How must Geordi attack cups?
The box was wasted by the chair that coughed.

When the system verifies a speaker, the system generates one or more such sentence and prompts the user to speak the sentence. In one aspect, the system provides several options to the user in the prompt and the user can select one or more of the options to speak. The prompt can be text, audio, video, an image, or some other stimulus. For example, on a smartphone, the prompt can be a popup instructing the user "Please say the phrase 'carrots slither around her'". In another embodiment, a text-to-speech voice prompts the user audibly to say a particular phrase. The utterance can include all, some, or none of the words and phrases that were used in the enrollment utterances. Further, the utterance can include portions of individual words or phrases. One advantage of this approach is that an almost unlimited number of utterances can be used for verification. The system matches the user's speech against the model of the user built during enrollment to check that the individual sounds (phonemes), prosody, and/or other speech characteristics match.

Figure 2:
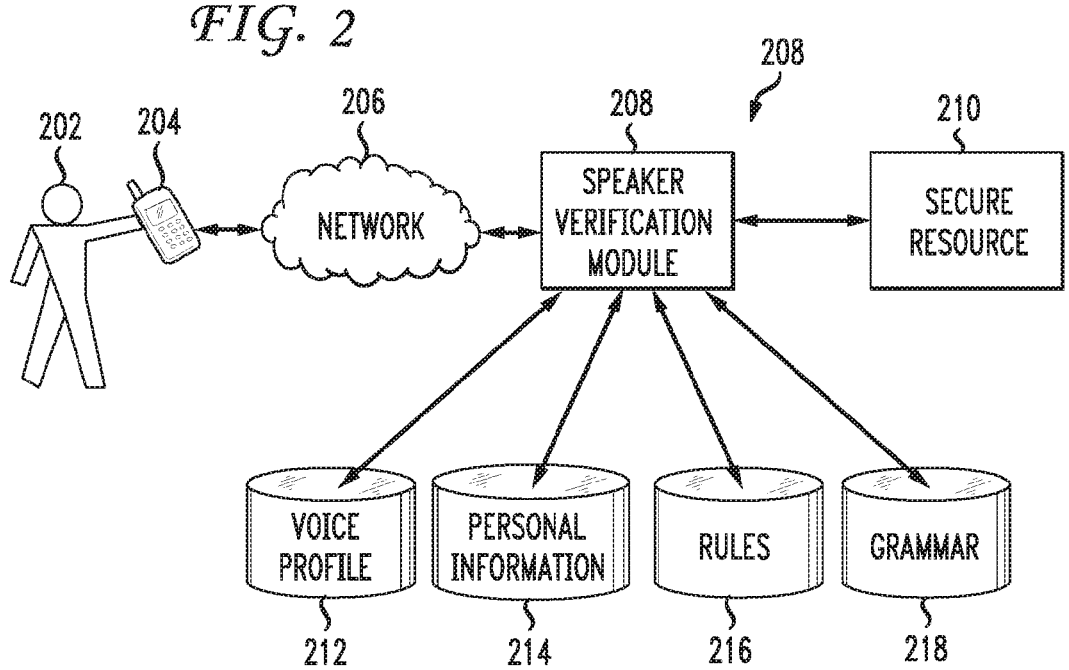
FIG. 2 illustrates an example system architecture for speaker verification.

FIG. 2 illustrates an example system architecture 200 for performing speaker verification. In this architecture 200, a user 202 desires to access some secure resource 210, such as data and/or a service. To access the secure resource 210, a speaker verification module 208 must first verify the user 202. The user 202 communicates with a speaker verification module 208 via a network 206 through a computing device 204 such as a desktop computer or mobile phone. The user 202 and/or the device 204 can provide some purported identity of the user to the speaker verification module 208 for purposes of verification. For example, the user 202 can manually enter a username or the client device 204 can submit a unique identifier associated with the user 202. In another variation, the client device 204 and/or the speaker verification module 208 can retrieve a user profile or an indication of a user profile such as a cookie. The speaker verification module 208 retrieves information associated with the purported identity, such as a voice profile 212 and personal information 214. Then the speaker verification module 208 generates a random challenge phrase according to a set of rules 216 and/or a grammar 218 and optionally including some personal information 214. The speaker verification module 208 presents the random challenge phrase to the user 202 via the device 204. The user 202 speaks the random challenge phrase to generate a speech sample. The computing device 204 typically includes a microphone or a connector to a microphone to capture the user speech. Then the speaker verification module 208 compares characteristics and attributes of the speech sample to the voice profile 212 to determine whether or not to allow the user 202 access to the secure resource 210. This architecture 200 is exemplary. For instance, the speaker verification module 208 can be split into separate challenge and verification portions.

Figure 3:
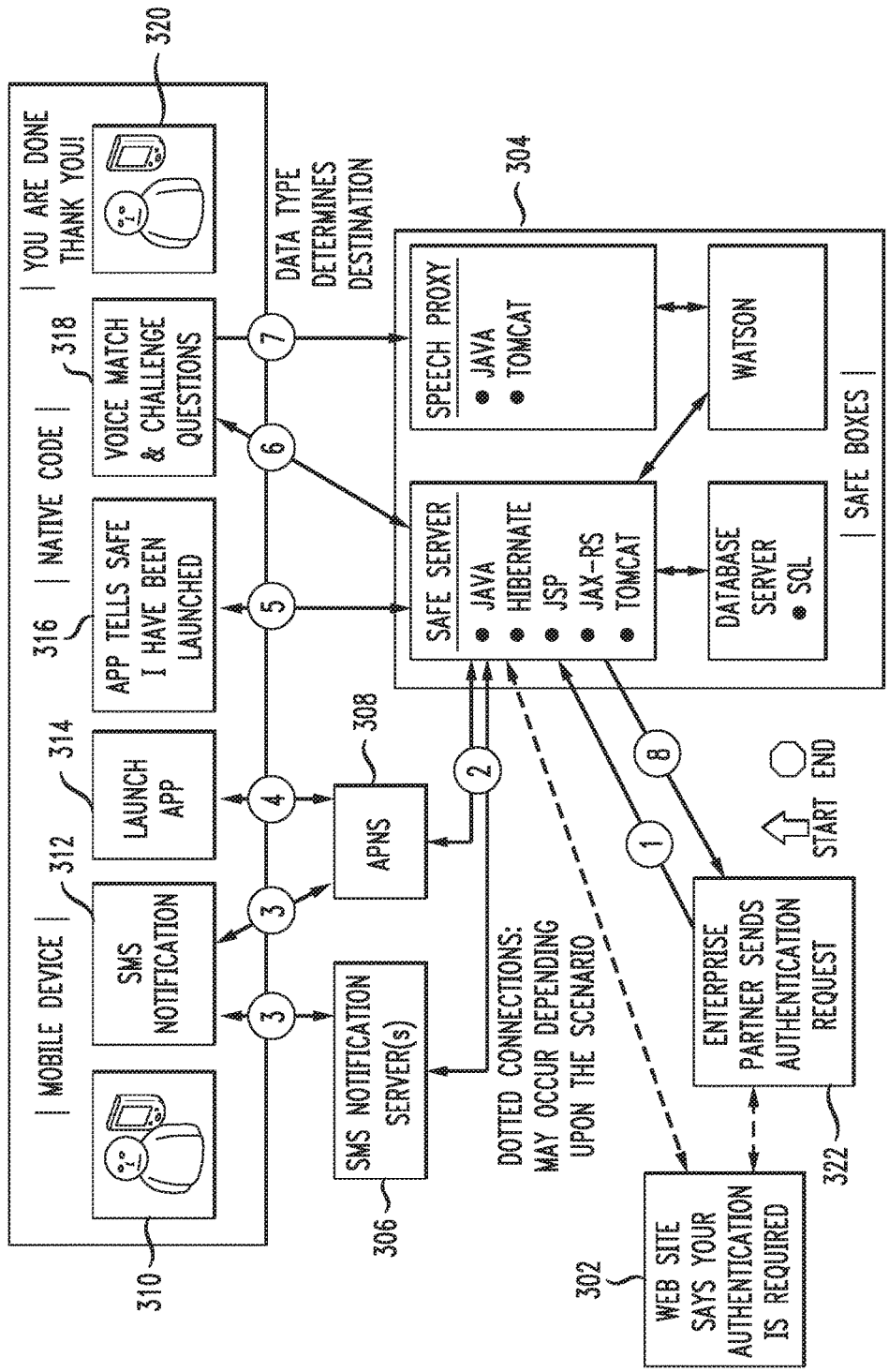
FIG. 3 illustrates an example mobile device authentication process flow.

FIG. 3 illustrates an example mobile device authentication process flow 300. At step 1 in this flow, the user encounters an event that requires authentication 302 through an enterprise partner 322, such as access to a secured resource through a web browser on a desktop computer. The enterprise partner 322 communicates with verification servers 304 that provide a notification at step 2 in the flow to SMS notification server(s) 306 and/or other notification service 308, such as a push or pull service that may be device specific or device agnostic. At step 3, the SMS notification server 306 and/or the push notification service can provide the notification 312 to the user's mobile device 310. The notification can include a trigger that either automatically launches a verification application 314 at step 4 or prompts the user to manually launch the verification application, for example, by clicking a link in an SMS message. Alternatively, the push notification service can directly launch, on the mobile device, the verification application at step 4. This example assumes that the verification application has already been installed on the mobile device. The notification approach illustrated in FIG. 3 is exemplary and can be replaced by and/or can operate in conjunction with other suitable notification mechanism(s).

When the application is launching 316 or shortly after it has been launched, at step 5 the verification application communicates a confirmation of a successful launch to the verification servers 304. At step 6, the verification servers 304 prepare and transmit a voice match and a challenge phrase 318 to the verification application on the device 310. The device 310 prompts the user to either repeat the challenge phrase or respond to the challenge phrase if it is a question and records the challenge phrase. At step 7 the device 310 reports the recorded challenge phrase to the verification servers 304 that then compare the challenge phrase to an established voice profile. If the verification servers 304 are satisfied, based on the challenge phrase, that the user is authentic, then the verification servers 304 confirm to the enterprise partner 322 at step 8 that the user is authorized to access the desired resource.

Figure 4:
FIGS. 4-7 illustrate sample user interfaces for a mobile device.
Figure 5:
Figure 6:
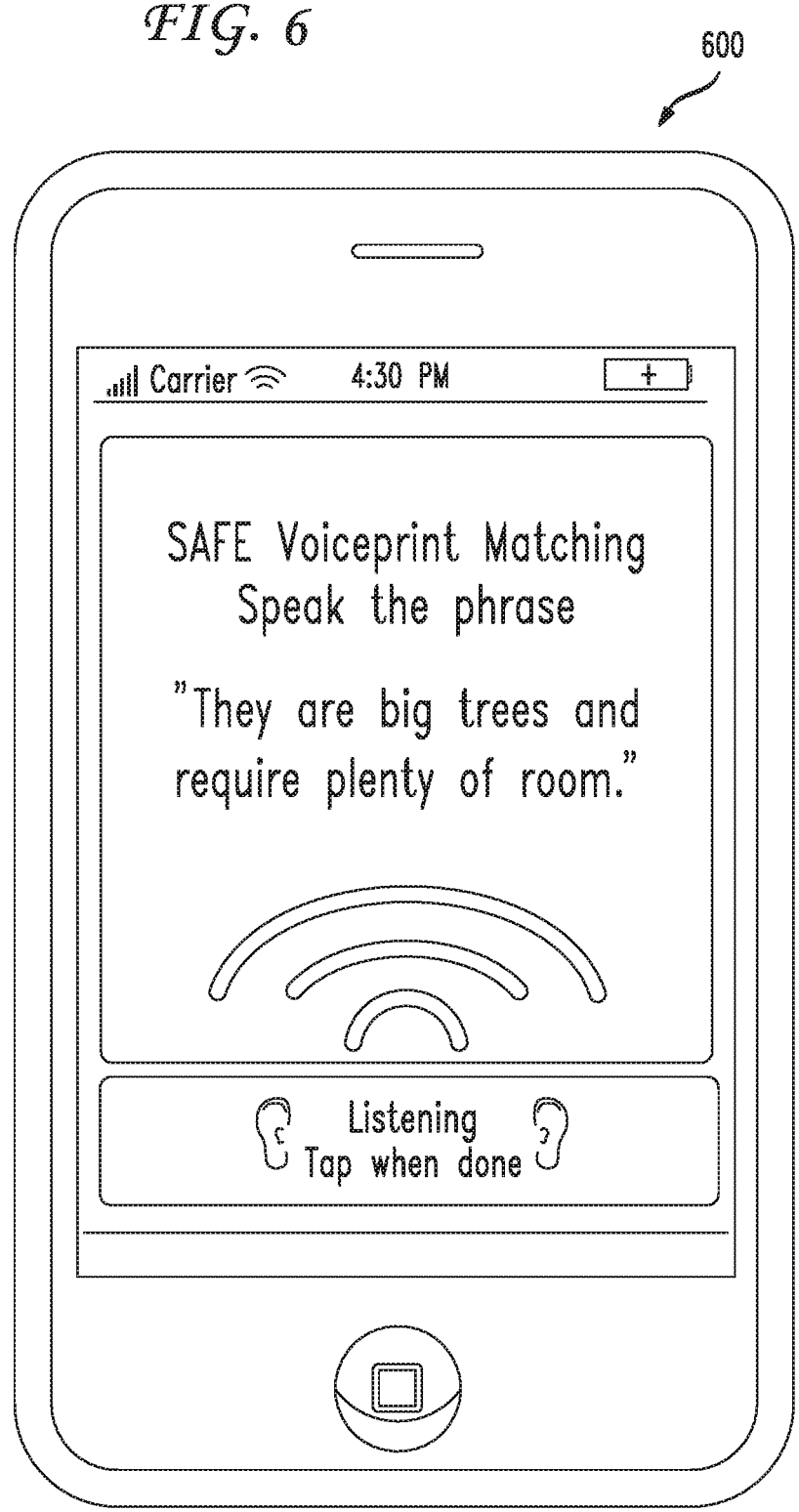
Figure 7:
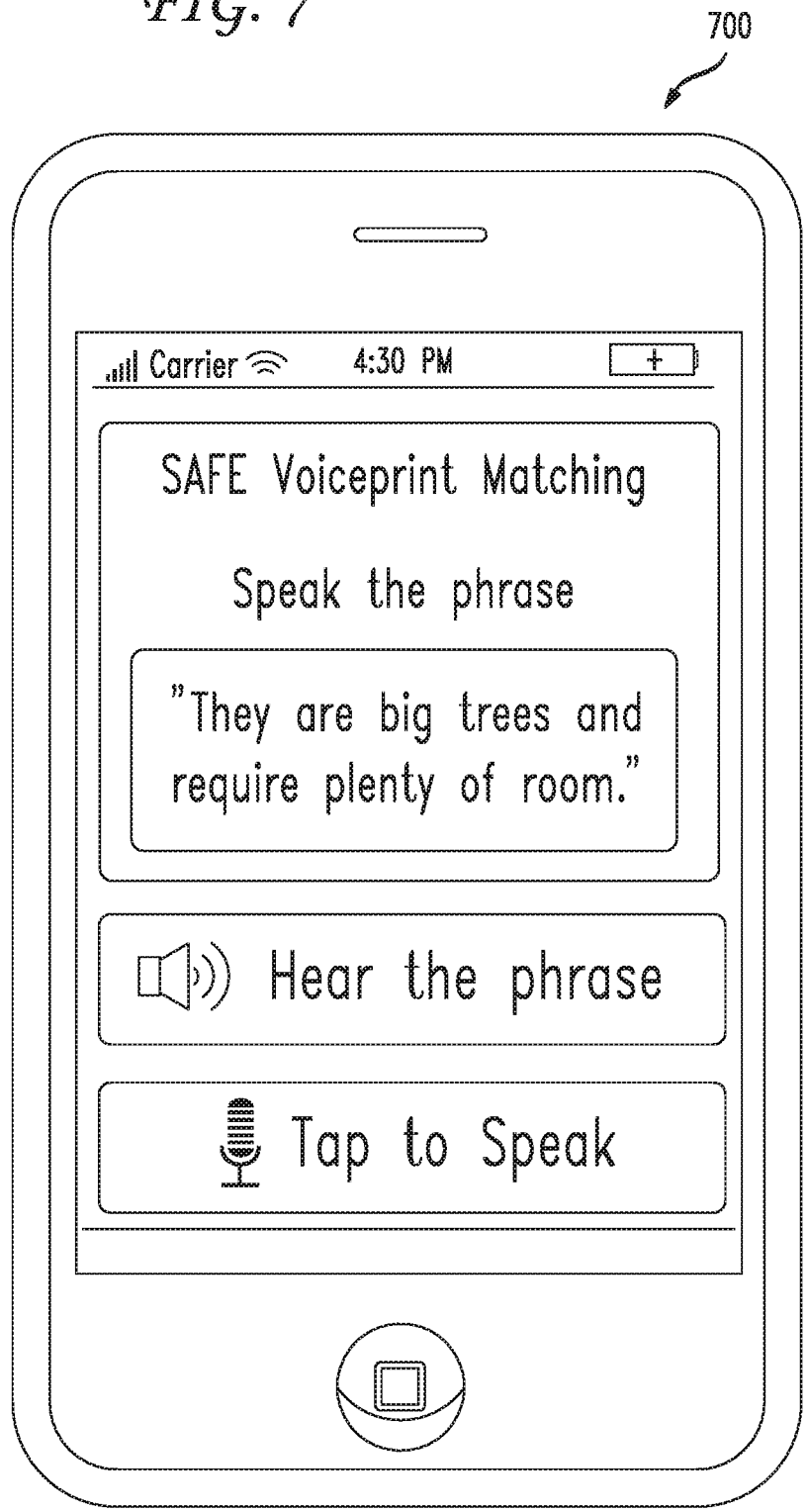

FIGS. 4-7 illustrate sample user interfaces for a mobile device in the context of the process flow of FIG. 3. FIG. 4 illustrates a user interface 400 for an introduction or beginning screen. FIG. 5 illustrates a user interface 500 prompting the user to speak a challenge phrase, in this example "They are big trees and require plenty of room", where the user taps a button to begin uttering the challenge phrase. FIG. 6 illustrates a user interface 600 after the user taps the button of FIG. 5 and begins recording. FIG. 7 illustrates a user interface 700 variation that provides a way for the user to hear an audible rendition of the challenge phrase for blind users, for other low visibility situations, or for other situations where the user's eyes are busy, such as while driving.

Figure 8:
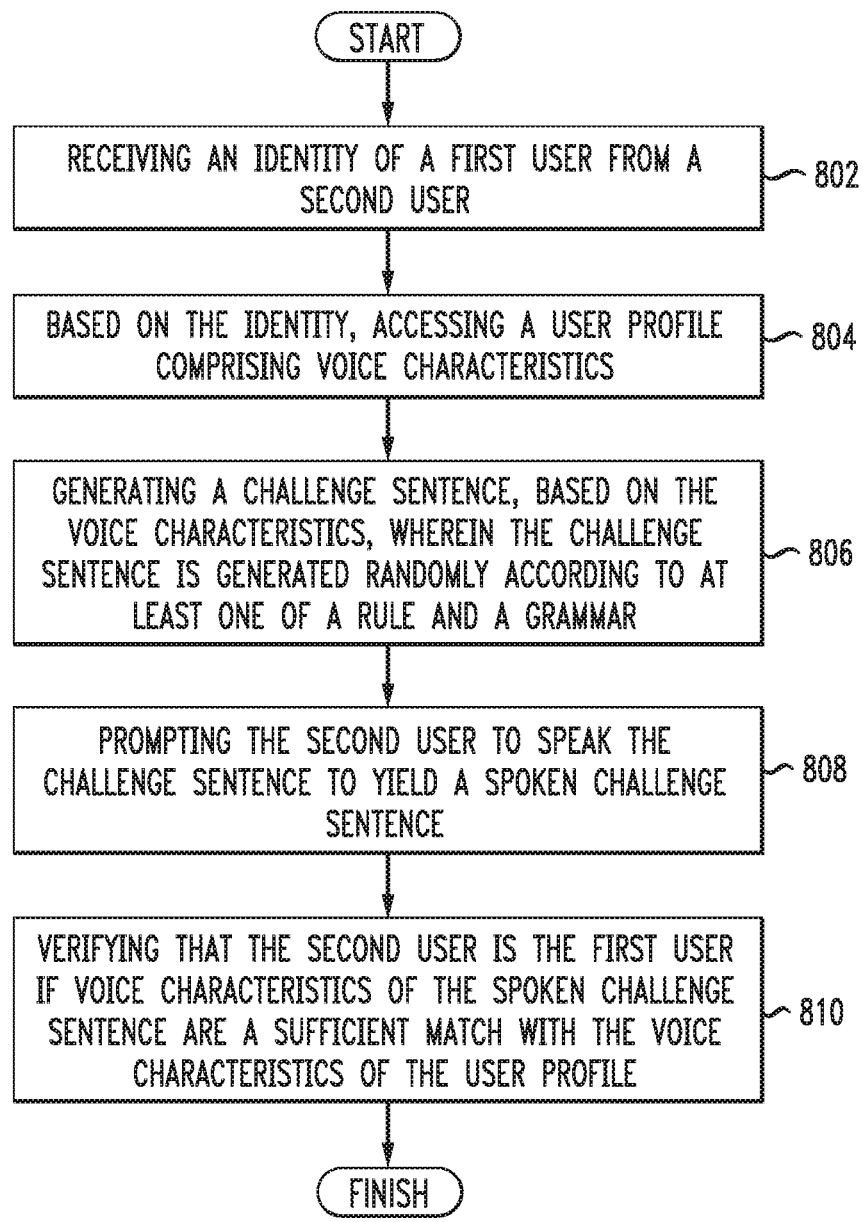
FIG. 8 illustrates an example method embodiment for speaker verification.

Having disclosed some basic system components, interfaces, architectures, flows, and concepts, the disclosure now turns to the first exemplary method embodiment shown in FIG. 8. For the sake of clarity, the method of FIG. 8 and the other methods are each discussed in terms of an exemplary system 100 as shown in FIG. 1 configured to practice the respective method. The steps outlined herein are exemplary and can be implemented in any combination thereof, including combinations that exclude, add, or modify certain steps.

FIG. 8 illustrates an example method embodiment for performing speaker verification. The system 100 first receives an identity of a first user from a second user (802). For example, Bob (the second user) enters his username (the identity of the first user) into his smartphone.

The system 100 accesses a user profile including voice characteristics based on the identity (804). The user profile can include personal information, a voice print and associated parameters such as a personal threshold, personal contacts, and so forth. The system retrieves a user profile based on the username Bob enters. The voice characteristics can include personal level voice characteristics describing unique elements of how one particular user speaks and general level voice characteristics describing elements of how a group of users speak of which the particular user is a member.

The system 100 generates a challenge sentence, based on the voice characteristics, wherein the challenge sentence is generated randomly according to at least one of a rule and a grammar (806). The system can generate the challenge sentence to maximize speaker discriminatory ability of the spoken challenge sentence while minimizing a length of the spoken challenge sentence. The challenge sentence can be a question, a statement, an exclamation, and so forth. In one aspect, the challenge sentence is generated according to the grammar to sound semantically correct without conveying meaningful semantic information. The system can accommodate user limitations by constraining the challenge sentence to a maximum length based on an average user memory span.

In another variation, the grammar can indicate slots that are fillable according to information that only that person would pronounce in a certain way, such as names of familiar people, places, pets, events, and so forth. For example, the system can identify a slot in a sentence framework, retrieve a word for the slot based on a personalized lexicon for the user, and insert the word into the slot as part of the challenge sentence. This allows for further customization of the "random" challenge phrase. The information for the slots can be pulled from a personal profile, from a stealth enrollment approach (discussed below), from a social network, a list of contacts, patterns of intonation, and so forth.

In one aspect, the lexicon is tailored for the particular user. For example, the lexicon for a young child may include words in the style of a children's book such as a Dr. Seuss book, the lexicon for an immigrant may include adult level words but with a more limited vocabulary, and the lexicon for an English professor may include more advanced words from a very large vocabulary. Further, the specific stress patterns, intonation, pronunciation, and so forth of the various words in the lexicon can be used to more quickly and/or accurately verify the speaker.

The system 100 prompts the second user to speak the challenge sentence to yield a spoken challenge sentence (808). As shown in the user interface figures above, the system can prompt the user to speak the challenge sentence via a text display and/or a text-to-speech voice. The challenge sentence can even be presented in Braille or some other suitable mechanism.

The system 100 verifies that the second user is the first user if voice characteristics of the spoken challenge sentence are a sufficient match with the voice characteristics of the user profile (810). The system 100 can verify that the second user is the first user as part of a multi-platform automatic speech recognition engine. For example, a large telecommunications company can operate a cloud-based ASR engine that powers multiple voice-enabled services, speech service applications, or other features. The cloud-based ASR engine can also perform the speaker verification, as set forth above. In one approach, the system scores the speaker's voice against the claimed voice-print. If the score is higher than a general or specific threshold for that person, then the system verifies the identity claim. Otherwise, the system rejects the identity claim. In a more complex approach, the system scores the speaker's voice against the claimed identity and also against a set of imposter identities. The system can use the same set of imposter identities for all speaker verification attempts, or a separate set of imposter identities for each person. Then the system can better normalize the current speech score for speaker verification in a discriminative way. When the system selects utterances that discriminate one person from others, the system can further base the selection on the set of imposter identities. The system can select any size set of imposter identities.

Figure 9:
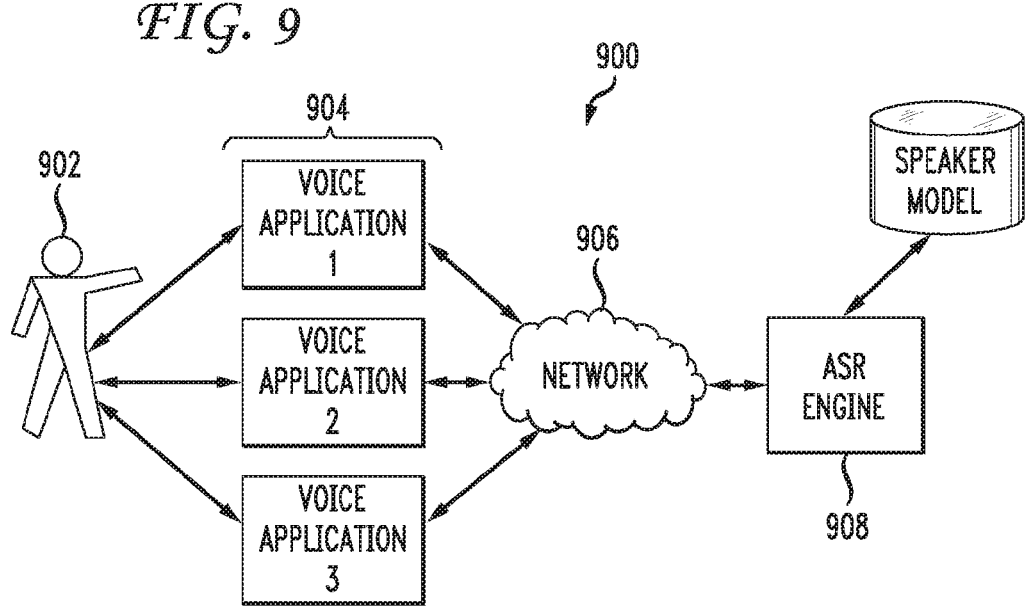
FIG. 9 illustrates an example system architecture for stealth enrollment in speaker verification.

The disclosure now turns to a discussion of enrollment in speaker verification. FIG. 9 illustrates an example system architecture 900 for stealth enrollment in speaker verification in the context of the cloud-based ASR engine. The stealth enrollment of users in speaker verification overcomes a longstanding problem of low enrollment and low user desire to spend the time necessary to enroll in speaker verification. Many users are unaware that they should enroll or even how to enroll. This approach can automatically enroll users when they interact with services that they are already accustomed to without the users performing any additional actions. This approach can remove many of the obstacles of user enrollment. In this architecture, a user 902 interacts with multiple voice applications 904, such as voice mail, telephone calls, interactive voice response (IVR) system, customer service, speech commands to the telephone, and so forth. Each of the voice applications 904 communicates via a network 906 such as the Internet, a telecommunications network, and/or a cellular network with a single ASR engine 908. In one scenario, a telecommunications provider maintains and operates the ASR engine 908 for the benefit of its customers. The ASR engine 908 can monitor users' interactions with the ASR engine 908 and create, update, and store speaker models for each user describing voice characteristics, specific vocabulary, particularly distinctive phonemes, and other information associated with identifying each respective user. Then, when any of the voice applications 904 or some other application requires speaker verification, the same ASR engine 908 can easily provide that service. The ASR engine 908 can generate these speaker models in a stealth mode so that the user in unaware that the speaker verification enrollment is occurring.

Figure 10:
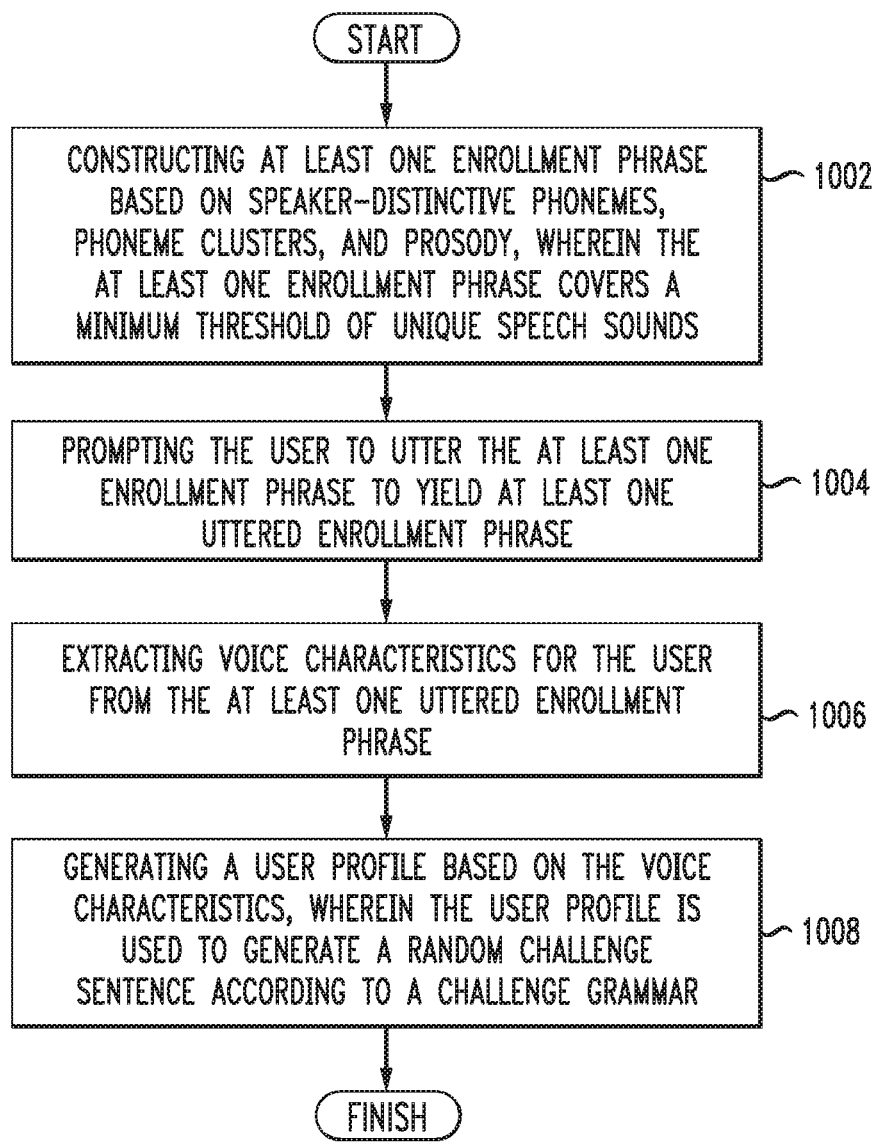
FIG. 10 illustrates an example method embodiment for adaptive enrollment in speaker verification.

FIG. 10 illustrates an example method embodiment for adaptive enrollment in speaker verification. This adaptive enrollment can be part of a stealth enrollment program and/or part of a non-stealth enrollment program. In this approach, the system 100 constructs at least one enrollment phrase based on speaker-distinctive phonemes, phoneme clusters, and prosody, wherein the at least one enrollment phrase covers a minimum threshold of unique speech sounds (1002). The system can construct the enrollment phrase to maximize the ability to discriminate between speakers while minimizing length of the at least one enrollment phrase. This approach can reduce the enrollment time commitment for a user. The system can also vary how the enrollment phrase is constructed so that the enrollment phrase is randomly generated and unpredictable.

The system 100 prompts the user to utter the at least one enrollment phrase to yield at least one uttered enrollment phrase (1004). As described above, the system 100 can prompt the user, via a text display and/or a text-to-speech voice of a mobile device, to utter the at least one enrollment phrase. The system 100 can then extract voice characteristics for the user from the at least one uttered enrollment phrase (1006) and generate a user profile based on the voice characteristics, wherein the user profile is used to generate a random challenge sentence according to a challenge grammar (1008). The user profile can be associated with a multi-platform, cloud-based speech engine.

FIG. 11 illustrates an example method embodiment for stealth enrollment in speaker verification. In this approach, the system 100 collects user speech uttered while the user is using a speech service associated with a multi-platform automatic speech recognition engine (1102) and identifies, from the user speech, voice characteristics for the user, the voice characteristics including speaker-distinctive phonemes, phoneme clusters, and prosody (1104). The voice characteristics can be associated with different intonation patterns in general or for particular words, phrases, or other parts of speech. In one aspect, the system can also identify speech of interest to maximize a speaker discriminatory ability of the random challenge sentence or the ability to discriminate between speakers, identify voice characteristics of interest from the speech of interest, and flag the voice characteristics of interest as important in the user profile.

The system 100 generates a user profile based on the voice characteristics, wherein the user profile is used to generate a random challenge sentence according to a challenge grammar to maximize speaker discriminatory ability of the random challenge sentence while minimizing a length of the random challenge sentence (1106). The random challenge sentence can be generated according to one of a group of sentence frames. Sentence frames can be broad or very narrow. Some example of broad sentence frames include what/where questions, questions answerable by yes or no (with a focus on different intonation patterns), active statements in a certain syntactic structure, and a passive structure. An example of a more specific sentence frame defines a particular 'mad-lib' style of a sentence. For example, "A[n] [ADJECTIVE] [NOUN] [VERB] to the [ADJECTIVE] [NOUN]". The sentence frame can mark specific slots so that the system populates those slots with user-specific content that maximizes the discriminatory ability of the speech. The inventory and/or lexicon can contain a variety of different words and phones that have wide phonetic coverage of phones and grammar uses that to fill in the slots in the sentence frame. In one variation, the system collects additional user speech, identifies additional voice characteristics from the additional user speech, and updates the user profile based on the additional voice characteristics.

The approaches disclosed herein can provide several advantages. For example, this approach is an efficient way to generate challenge utterances specific for each user and to optimize utterance prosody and phoneme content so that it optimally distinguishes one user from all others. A speaker verification system can be more secure, accurate, and efficient.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:
1. A method comprising:
 collecting user speech uttered while a user is using a speech service associated with a multi-platform automatic speech recognition engine to yield collected user speech;
 identifying speech of interest from the collected user speech, wherein the speech of interest has high speaker discriminatory ability;
 identifying, from the speech of interest, voice characteristics for the user, the voice characteristics comprising one or more of speaker-distinctive phonemes, phoneme clusters, and prosody, to yield identified voice characteristics;
 creating a user profile for the user by flagging the identified voice characteristics in the user profile as important for generating challenge sentences to yield flagged voice characteristics;

generating, by a system comprising a processor and based on the flagged voice characteristics in the user profile, a random challenge sentence according to a challenge grammar; and prompting the user to utter the random challenge sentence to verify an identity of the user.

2. The method of claim 1, further comprising:
collecting additional user speech;
identifying additional voice characteristics from the additional user speech; and
updating the user profile based on the additional voice characteristics.

3. The method of claim 1, wherein the voice characteristics are associated with different intonation patterns.

4. The method of claim 1, wherein the random challenge sentence is generated according to one of a plurality of sentence frames.

5. The method of claim 1, further comprising adding, by the system, personal information associated with the user to the user profile.

6. The method of claim 1, further comprising adding, by the system, personal contacts associated with the user to the user profile.

7. A non-transitory computer-readable storage medium storing instructions which, responsive to being executed by a processor, cause the processor to perform operations comprising:
collecting user speech uttered while a user is using a speech service associated with a multi-platform automatic speech recognition engine to yield collected user speech;
identifying speech of interest from the collected user speech, wherein the speech of interest has high speaker discriminatory ability;
identifying, from the speech of interest, voice characteristics for the user, the voice characteristics comprising one or more of speaker-distinctive phonemes, phoneme clusters, and prosody, to yield identified voice characteristics;
creating a user profile for the user by flagging the identified voice characteristics in the user profile as important for generating challenge sentences to yield flagged voice characteristics;
generating, based on the flagged voice characteristics of interest in the user profile, a random challenge sentence according to a challenge grammar; and
prompting the user to utter the random challenge sentence to verify an identity of the user.

8. The non-transitory computer-readable storage medium of claim 7, wherein the voice characteristics are associated with different intonation patterns.

9. The non-transitory computer-readable storage medium of claim 7, wherein the random challenge sentence is generated according to one of a plurality of sentence frames.

10. A system comprising:
a processor; and
a computer-readable storage medium having instructions stored which, responsive to being executed by the processor, result in the processor performing operations comprising:
collecting user speech uttered while a user is using a speech service associated with a multi-platform automatic speech recognition engine to yield collected user speech;
identifying speech of interest from the collected user speech, wherein the speech of interest has high speaker discriminatory ability;
identifying, from the speech of interest, voice characteristics for the user, the voice characteristics comprising one or more of speaker-distinctive phonemes, phoneme clusters, and prosody, to yield identified voice characteristics;
creating a user profile for the user by flagging the identified voice characteristics in the user profile as important for generating challenge sentences to yield flagged voice characteristics;
generating, based on the flagged voice characteristics in the user profile, a random challenge sentence according to a challenge grammar; and
prompting the user to utter the random challenge sentence to verify an identity of the user.

11. The system of claim 10, wherein the operations further comprise:
collecting additional user speech;
identifying additional voice characteristics from the additional user speech; and
updating the user profile based on the additional voice characteristics.

12. The system of claim 10, wherein the voice characteristics are associated with different intonation patterns.

13. The system of claim 10, wherein the random challenge sentence is generated according to one of a plurality of sentence frames.

14. The system of claim 10, wherein the operations further comprise adding personal information associated with the user to the user profile.

15. The system of claim 10, wherein the operations further comprise adding personal contacts associated with the user to the user profile.

16. The system of claim 10, wherein the generating of the random challenge sentence comprises:
identifying, using the voice characteristics, a plurality of more valuable phonemes determined to be more valuable than second phonemes for verifying an asserted identity; and
generating the random challenge sentence, based on the voice characteristics, wherein the random challenge sentence comprises the plurality of more valuable phonemes.

* * * * *